(12) United States Patent
Unni et al.

(10) Patent No.: US 10,895,382 B2
(45) Date of Patent: Jan. 19, 2021

(54) SYSTEM AND METHOD FOR OPTIMIZING PASSIVE CONTROL OF OSCILLATORY INSTABILITIES IN TURBULENT FLOWS

(71) Applicants: INDIAN INSTITUTE OF TECHNOLOGY MADRAS (IIT MADRAS), Chennai (IN); POTSDAM INSTITUTE FOR CLIMATE IMPACT RESEARCH, Potsdam (DE)

(72) Inventors: Vishnu R. Unni, Chennai (IN); Sujith Ramanpillai Indusekharan Nair, Chennai (IN); Abin Krishnan, Chennai (IN); Norbert Marwan, Potsdam (DE); Jürgen Kurths, Potsdam (DE)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 0 days.

(21) Appl. No.: 16/287,248

(22) Filed: Feb. 27, 2019

(65) Prior Publication Data
US 2019/0264916 A1 Aug. 29, 2019

(51) Int. Cl.
 *G05B 17/02* (2006.01)
 *F23N 5/26* (2006.01)
 (Continued)

(52) U.S. Cl.
 CPC ........... *F23N 5/265* (2013.01); *F15D 1/0025* (2013.01); *F23R 3/00* (2013.01); *G01M 15/14* (2013.01); *G05B 17/02* (2013.01); *G06F 17/15* (2013.01); *F23N 2223/10* (2020.01); *F23N 2223/40* (2020.01); *F23N 2223/44* (2020.01);
 (Continued)

(58) Field of Classification Search
 CPC .. F23N 5/265; F23N 2223/10; F23N 2223/40; F23N 2223/44; F23N 2227/12; F23N 2241/20; F23R 3/00; F23R 2900/00014; F23R 2900/00013; G05B 17/02; G01M 15/14; F15D 1/0025; G06F 17/15
 See application file for complete search history.

(56) References Cited

U.S. PATENT DOCUMENTS

8,038,102 B2 * 10/2011 Miller ..................... B64C 21/02
244/200.1
9,804,054 B2 * 10/2017 Vinod ................. G01M 13/028
(Continued)

*Primary Examiner* — Christopher E. Everett
(74) *Attorney, Agent, or Firm* — Convergence Intellectual Property Law P.C; Jonathan Garfinkel (57) ABSTRACT

The invention discloses a system for effecting a control strategy in a reactive flow field of a turbulent flow system. The system is configured to analyze flow field properties such as velocity, heat release rate, or mixture fraction of a device during the onset of the oscillatory instability using measures from complex network theory such as betweenness centrality, degree, or closeness. The system identifies critical regions in the flow field responsible for the oscillatory instability. Further, the system also identifies optimal control strategies to avoid the onset of oscillatory instabilities by analyzing the relative strength of various network parameters and thereby controlling oscillatory instabilities which are detrimental to the fluid dynamic system. The disclosed method and system provide for optimization of control of oscillatory instabilities in fluid dynamic systems.

10 Claims, 11 Drawing Sheets

(51) Int. Cl.
*F15D 1/00* (2006.01)
*G06F 17/15* (2006.01)
*F23R 3/00* (2006.01)
*G01M 15/14* (2006.01)

(52) U.S. Cl.
CPC ...... *F23N 2227/12* (2020.01); *F23N 2241/20* (2020.01); *F23R 2900/00013* (2013.01); *F23R 2900/00014* (2013.01); *G05B 2219/13176* (2013.01)

(56) References Cited

U.S. PATENT DOCUMENTS

| | | | | |
|---|---|---|---|---|
| 2006/0218933 | A1* | 10/2006 | Schuermans | F23N 1/002 60/776 |
| 2006/0266045 | A1* | 11/2006 | Bollhalder | F23N 5/16 60/725 |
| 2010/0076698 | A1* | 3/2010 | He | F23N 5/242 702/35 |
| 2013/0327050 | A1* | 12/2013 | Slobodyanskiy | F23N 1/022 60/772 |
| 2015/0192912 | A1* | 7/2015 | Kalya | F02C 9/34 700/287 |
| 2015/0260611 | A1* | 9/2015 | DeSilva | G01F 1/662 73/112.01 |
| 2017/0051683 | A1* | 2/2017 | Murugesan | F02C 9/48 |
| 2017/0350269 | A1* | 12/2017 | Miranda | F01D 11/24 |
| 2018/0202660 | A1* | 7/2018 | Chaudhuri | F23R 3/14 |

* cited by examiner

SYSTEM AND METHOD FOR OPTIMIZING PASSIVE CONTROL OF OSCILLATORY INSTABILITIES IN TURBULENT FLOWS

CROSS-REFERENCES TO RELATED APPLICATIONS

This application claims priority to Indian Provisional Patent Application No. 201841007455 entitled "System and Method for Optimizing Passive Control of Oscillatory Instabilities in Turbulent Flows" filed on Feb. 27, 2018 and the complete specification Indian Patent Application No. 201841007455 entitled "System and Method for Optimizing Passive Control of Oscillatory Instabilities in Turbulent Flows" filed on Feb. 8, 2019, which are incorporated herein by reference in their entirety.

FIELD OF THE INVENTION

The disclosure relates generally to instabilities in turbulent systems and in particular to controlling oscillatory instabilities in turbulent flow fluid systems.

DESCRIPTION OF RELATED ART

Emergence of oscillatory instability is ubiquitous to various fluid dynamic systems. One particular fluid system exhibiting oscillatory instability is a gas turbine combustor, which houses a confined turbulent reactive flow. During the stable state of combustor operation, the reactive flow field exhibits incoherent turbulent fluctuations. However, under certain operational conditions, the flow field reorganizes, and a periodic behavior emerges. During this dynamical regime, known as thermoacoustic instability, the acoustic field inside the combustor exhibits dangerous large amplitude oscillations. Such oscillations can often cause increased wear and tear and/or catastrophic failures to the combustor. Hence, methodologies to control such oscillatory instabilities are often sought out. There exists various control methodologies to avoid thermoacoustic instabilities such as staged fuel injection, use of liners as acoustic dampers of combustor, use of micro jets, porous inserts, or the like. Since the combustor is a spatially extended system, the effectiveness of such control strategies depends upon the particular locations where the control strategies are applied on the combustor.

Thermoacoustic instability can be suppressed using two approaches—active control and passive control. Active control involves the use of dynamic, closed loop control of thermoacoustic instability using high end actuators. Hence, active control measures are expensive and significantly add complexity to the design of combustors. Passive control, on the other hand, is simple and cost effective. Passive control involves either increasing the dissipation of acoustic energy using acoustic liners, baffles and Helmholtz or quarter wave resonators or reducing the efficiency of acoustic driving by changing the injector geometry and the flame dynamics.

The patent application US20170051683A1 includes a method for predicting the operational state of equipment with turbulent flow characterized by time series data relating to its operation. The U.S. Pat. No. 9,804,054B2 discloses a system for early detection of onset of oscillatory instabilities in practical devices. The application US20060218933A1 relates to a model-based active control system for a gas turbine. U.S. Pat. No. 8,038,102B2 provides a system and method for actively manipulating and controlling aerodynamic or hydrodynamic flow field vortices within a fluid flow over a surface using micro-jet arrays. Various non-patent literatures also discuss about the various control strategies that are applied during oscillatory instabilities in flow control systems. Steele et al., "Passive control of combustion instability in lean premixed combustors" (1999) suppressed thermoacoustic instability in a gas turbine engine by changing the axial location of the fuel injector. A triangular cross section for the inlet, instead of a circular cross section, suppressed thermoacoustic instability in a dump combustor as disclosed by Gutmark et al., "Noncircular jets in combustion systems. Experiments in Fluids, 7(4), pp. 248-258)", (1989). Combustion along the corner of the triangular inlet happened in a smooth and random manner due to the increased small scale turbulence. Paschereit et al. "Combustion control by vortex breakdown stabilization," (2006, Journal of turbomachinery, 128(4), pp. 679-688) suppressed thermoacoustic instability in a swirl stabilized combustor by stabilizing the vortex breakdown in the wake of an extended pilot lance. Atlay et al, "Mitigation of thermoacoustic instability utilizing steady air injection near the flame anchoring zone," (2010. Combustion and Flame, 157(4), pp. 686-700) used steady micro jet air injection near the flame anchoring zone in a dump combustor to mitigate thermoacoustic instability. An effective system for implementing a control strategy in a reactive flow field of a turbulent flow system is needed.

SUMMARY OF THE INVENTION

In various embodiments, a computer implemented method for effecting an optimal control strategy in a reactive flow field of a turbulent flow system is disclosed. The method includes the steps of receiving data from a sensing element connected to the turbulent flow system. Such data may also be obtained from numerical simulations using computation fluid dynamics (CFD) techniques such as large eddy simulations (LES) or direct numerical simulations (DNS) or any other CFD calculation. The turbulent flow system incorporates a control strategy having at least a passive/active control strategy in the turbulent flow field. The method then obtains one or more flow field characteristics for the turbulent flow system such as velocity, local reaction rate, temperature, mixture fraction and their like. A complex network consisting of a plurality of nodes and a plurality of links is constructed based on the flow field characteristics. An adjacency matrix of size N×N, where N is the number of nodes of the network, describing the complex network is obtained. Network measures characterizing one or more topological features of the network such as betweenness centrality, degree, closeness centrality, transitivity and local clustering coefficient are estimated from the adjacency matrix. One or more critical regions of the reactive flow field are identified using topological features of the constructed complex network. Further, one or more modifications to the control strategy are applied based on the identified one or more critical regions.

In various embodiments the method includes constructing the complex network based on the flow field characteristics. The method of constructing the complex network includes dividing the flow field into multiple, uniform or non-uniform grids representing the plurality of nodes (N) in the network. A correlation coefficient is obtained between a pair of time series of flow field characteristics at two different nodes. These nodes are connected to form a link if the correlation coefficient is above a threshold. These steps are repeated for the plurality of all the pairs of nodes to obtain the plurality of links in the networks.

In some embodiments identifying one or more critical regions of the flow field using topological features of the constructed complex network includes determining a relative strength of the topological features across reaction fields during or at the onset of oscillatory instabilities.

In various embodiments the passive control strategy is selected from increasing the dissipation of acoustic energy, reducing the efficiency of acoustic driving, changing the axial location of the fuel injector, using a triangular cross section for the inlet, incorporating a multi-step dump having several backward facing steps, using a miniature vortex generators in the inlet of the swirlers and at the exit of the burner circumference to interfere with the rollup of vortices by inducing stream wise vorticity, using perforated flame holders, placing perforated shrouds above the flame holders, stabilizing the vortex breakdown, placing a porous inert material at the dump plane, increasing the thickness of the perforated plate, using dynamic phase converters, using steady micro jet air injection near the flame anchoring zone, using flash atomization, and fuel staging. The above-mentioned passive control strategies are applied at different spatial locations in the combustor to avoid the onset of thermoacoustic instability. For maximum effect in controlling thermoacoustic instability, the selected passive control strategy is optimally positioned at the critical locations identified using topological features of the constructed complex network.

In some embodiments the constructed complex network is a spatial network or a spatio-temporal network.

In some embodiments the control strategy further includes an active control strategy to be applied at the one or more identified critical regions to control the oscillatory instabilities.

In various embodiments the data is obtained from particle image velocimetry (Hy), Laser Doppler Velocimetry (LDV), Doppler Global Velocimetry (DGV), planar laser induced fluorescence (PLIF), high-speed chemiluminescence, pressure measurement or from high fidelity computational fluid dynamics (CFD) simulations such as Large Eddy Simulation, Direct Numerical Simulation and/or their like.

The turbulent flow system in various embodiments is a combustor and the oscillatory instabilities comprise thermoacoustic instability.

In various embodiments, if the oscillatory instabilities are higher than or equal to a predetermined level, one or more modifications to the passive control strategy as determined by the network analysis is applied to control the oscillatory instability.

In various embodiments a system for effecting a control strategy in a reactive flow field of a turbulent flow system is disclosed. The system includes a processor and a non-transitory computer readable storage medium having instructions encoded thereon. In various embodiments when the instructions are executed by the processor, the processor is configured to receive data from a sensing element connected to the turbulent system that incorporates at least a passive control strategy in the reactive flow field. In another embodiment the data provided to the system may be obtained from a numerical simulation of the turbulent system. The processor is configured to obtain one or more flow field characteristics for the turbulent flow system selected from velocity, local reaction rate, temperature, and mixture fraction, construct a complex network from the plurality of nodes and links based on the flow field characteristics, construct an adjacency matrix of size N×N describing a complex network corresponding to the obtained flow field characteristics, estimate network measures to characterize the topological features of the network selected from betweenness centrality, degree, closeness centrality, transitivity and local clustering coefficient. Further the processor is configured to identify one or more critical regions of a reactive flow field analyzing the topological features of the constructed complex network. Furthermore the processor is configured to apply one or more modifications to the passive control strategy based on the identified one or more critical regions.

In various embodiments, a computer program product for effecting an optimal control strategy in a reactive flow field of a turbulent flow system is disclosed.

This and other aspects are disclosed.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention in its various embodiments proposes a system, a method and a computer program product to optimize passive or slow control of oscillatory instabilities in fluid systems which may be susceptible to oscillatory instabilities that are detrimental to the system. In particular a method for effecting an optimal control strategy in a reactive flow field of a turbulent flow system is disclosed.

Figure 1A:
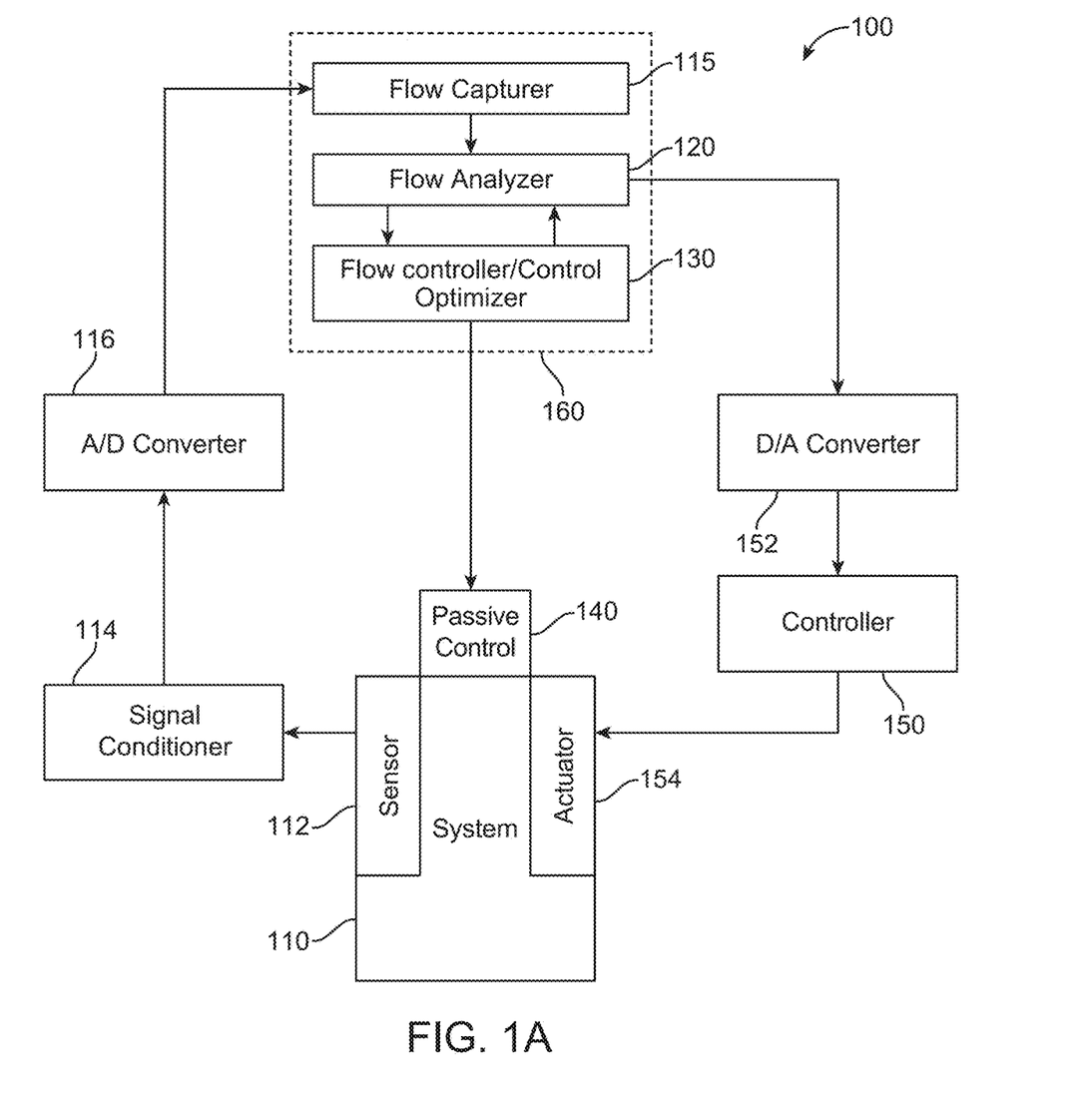
FIG. 1A illustrates a block diagram of a system for optimizing control of oscillatory instabilities in turbulent flow systems

In various embodiments a system 100 for effecting a control strategy in a reactive flow field of a turbulent flow system is disclosed. The system 100 as shown in FIG. 1A includes a turbulent flow system 110, having a sensing unit, an optimizer 160 attached to a passive control 140, a controller 150 and an actuator 154. The sensing unit includes a sensor 112, a signal conditioner 114 and an analog to digital converter 116. The optimizer 160 has a flow capturer 115, a flow analyzer 120 and a flow optimizer 130. The flow capturer 115 is configured to acquire the flow characteristics inside the turbulent flow system through the signals from the sensor. The signal may be spatial data or spatio-temporal data of a single system variable or multiple system variables. The signal conditioner 114 is used to condition the signals from the turbulent system 110. A/D converter 116 converts the analog signals from the system to digital signals. The flow analyzer 120 is configured to analyze the flow characteristics acquired in the flow capturer 115 using complex network theory to identify the backbones or critical regions of self-organization inside the turbulent flow system that is responsible for the onset of thermoacoustic instability. The critical regions of the flow are the locations where the control strategy needs to be applied. The processing may involve organization of data, filtering of data, extrapolation of data etc. The processed signal is then input to a flow controller 130 or optimizer that is configured to modify a passive control 140 that is applied on the turbulent flow system 110 based on the restrictions imposed by the choice of the control strategy. The restrictions may include the restrictions in modifications to the control strategy as directed by the design methodology of a combustor, operational envelope of the combustor, or mechanical constraints involved in the realization of the control strategy.

In some embodiments for active control, the flow controller 130 is configured to provide instructions to a processing unit 150 or numerical simulator that produces necessary control signals. The control signal goes through a D/A converter 152 and reaches the controller 150 which in turn uses the actuator 154 to implement the control on the system 110. In other embodiments, the control signal is a set of instructions for modification of control strategy based on design of the reactor.

Figure 1B:
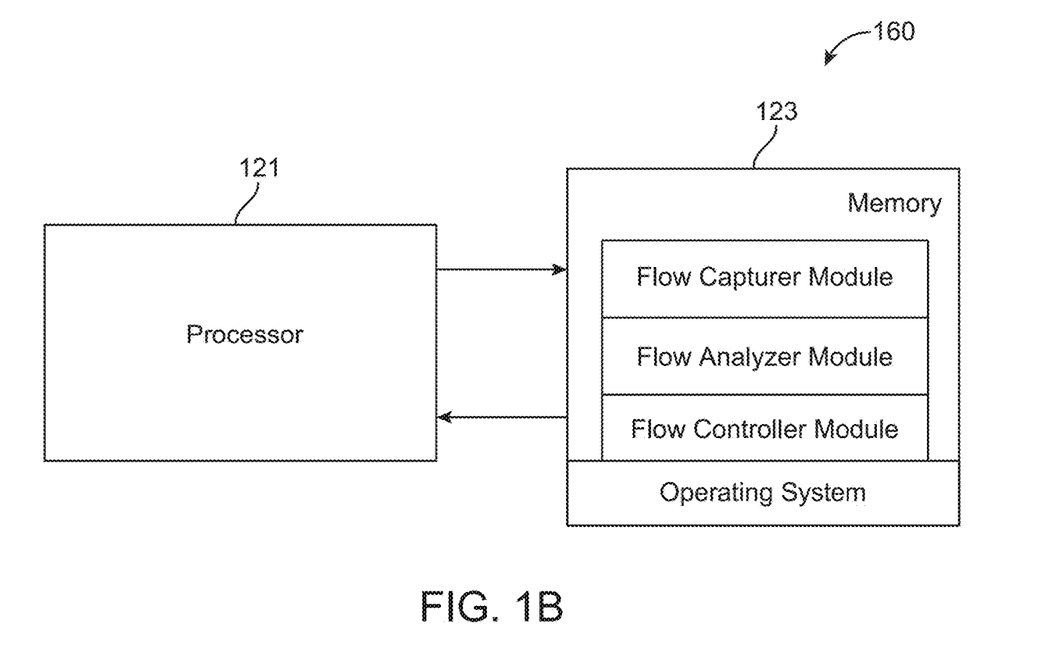
FIG. 1B shows the processing unit and the non-transitory computer readable storage medium of the turbulent flow systems.

In various embodiments the optimizer 160 for effecting a control strategy in a reactive flow field of a turbulent flow system as shown in FIG. 1B includes a processor 121 and a non-transitory computer readable storage medium 123. The storage medium 123 that has instructions encoded for a flow capturer module, flow analyzer module and flow controller module. In various embodiments the instructions when executed by the processor 121, cause the processor 121 to receive data from the sensing element 112 that is connected to the turbulent system 110 and obtain one or more flow field characteristics for the turbulent flow system in the flow capturer module. The flow field characteristics are selected from velocity, local reaction rate, temperature, and mixture fraction. In other embodiments, the flow field characteristics are obtained from numerical simulations. In the flow analyzer module the processor 121 is configured to construct a complex network from the plurality of nodes and links based on the flow field characteristics and obtain an adjacency matrix of size N×N describing the complex network. Further in the flow analyzer module the processor is configured to find network measures to characterize the topological features of the network and identify one or more critical regions of a reactive flow field using topological features of the constructed complex network. The processor 121 is further configured to apply one or more modifications to the passive control strategy based on the identified one or more critical regions.

Figure 2:
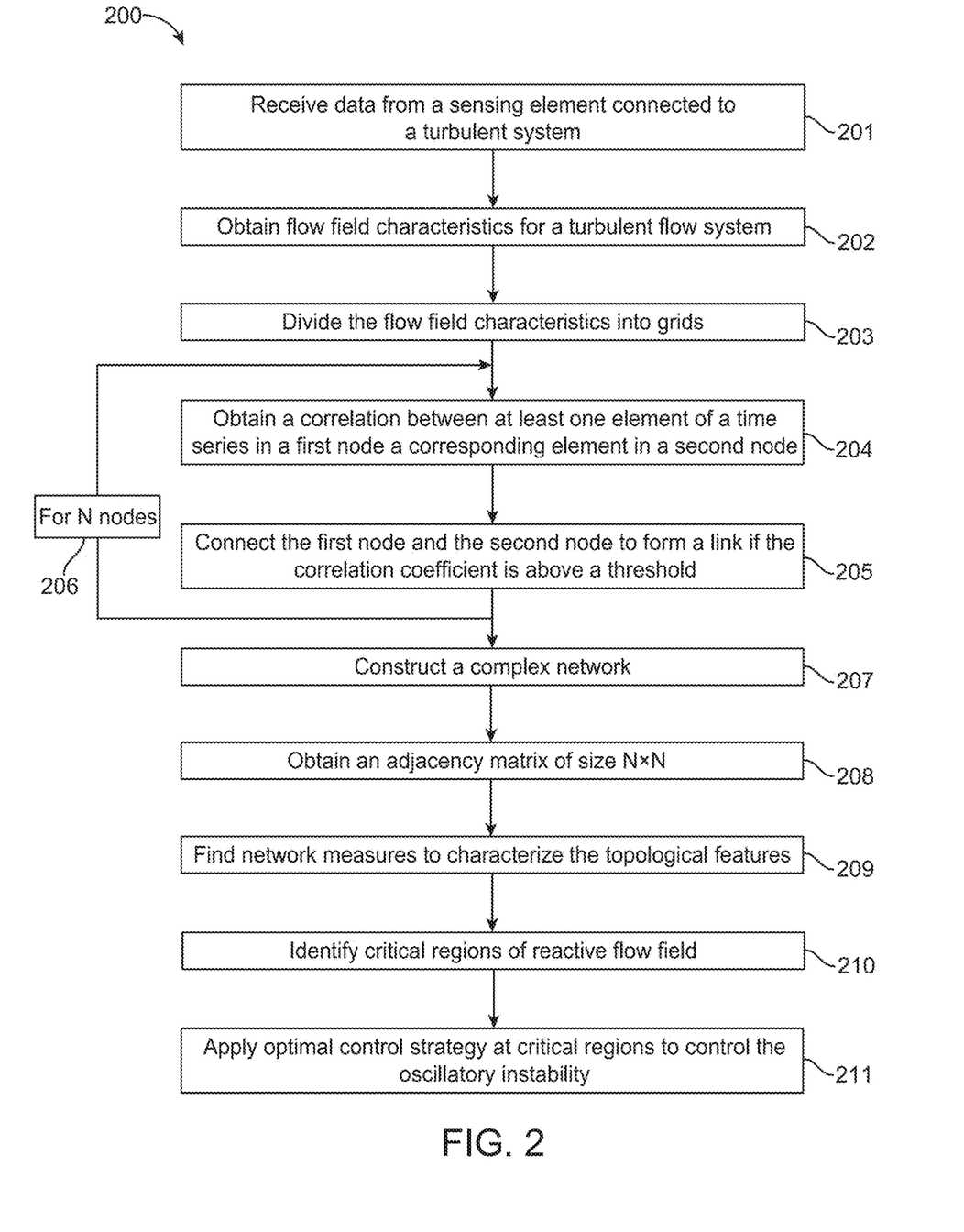
FIG. 2 illustrates the method of optimizing control of oscillatory instability in turbulent flow systems
Figure 3A:
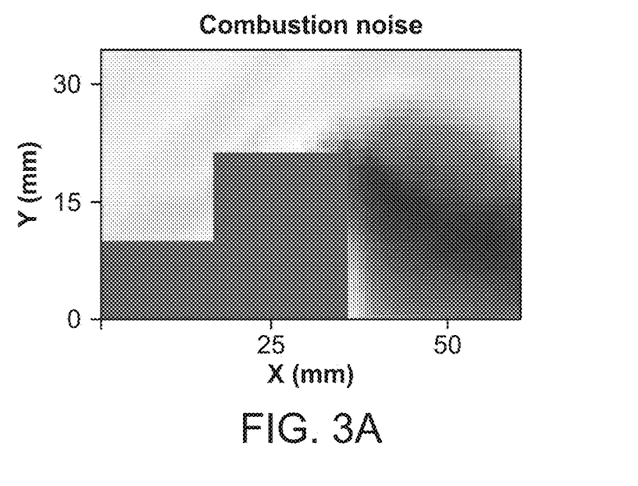
FIG. 3A illustrates the spatial distribution of degree during combustion noise obtained by constructing a spatial network using Pearson correlation keeping the threshold correlation coefficient at 0.25.
Figure 3B:
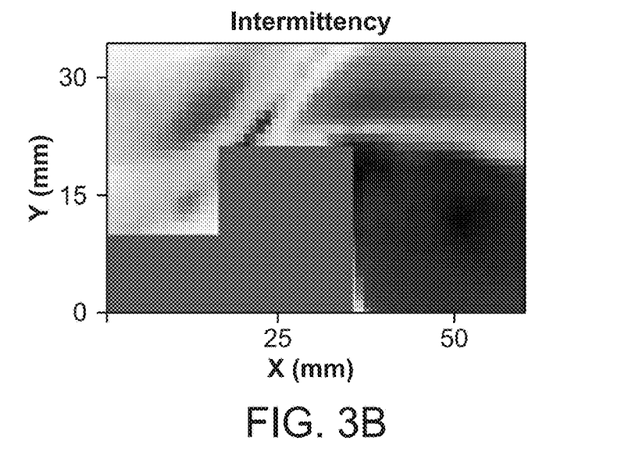
FIG. 3B illustrates the spatial distribution of degree during intermittency obtained by constructing a spatial network using Pearson correlation keeping the threshold correlation coefficient at 0.25.
Figure 3C:
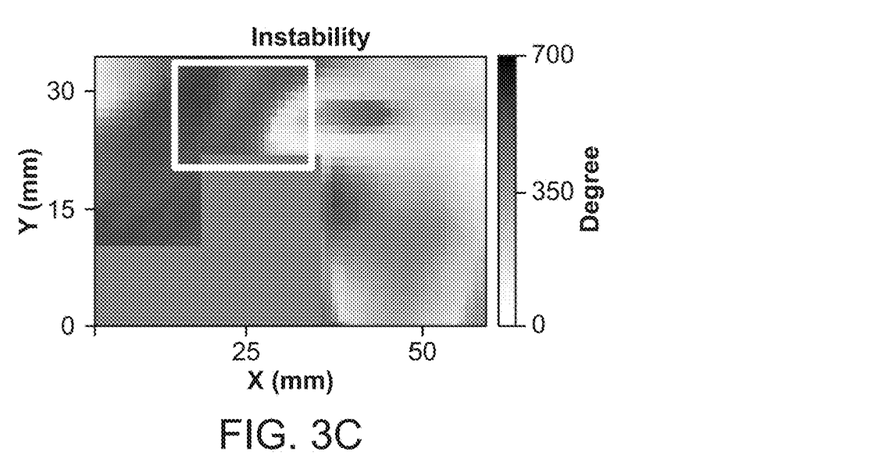
FIG. 3C illustrates the spatial distribution of degree during thermoacoustic instability obtained by constructing a spatial network using Pearson correlation keeping the threshold correlation coefficient at 0.25.
Figure 4A:
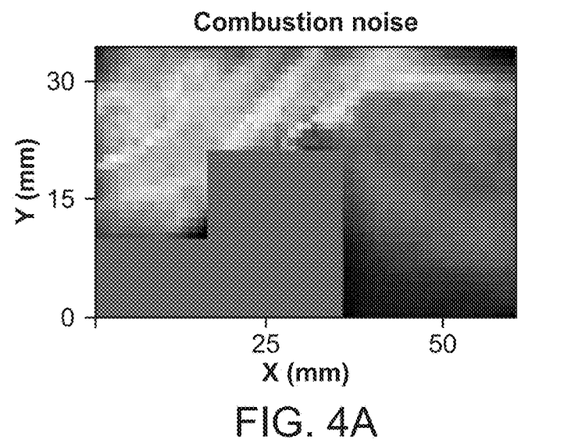
FIG. 4A illustrates the spatial distribution of local clustering coefficient during combustion noise obtained by constructing a spatial network using Pearson correlation keeping the threshold correlation coefficient at 0.25.
Figure 4B:
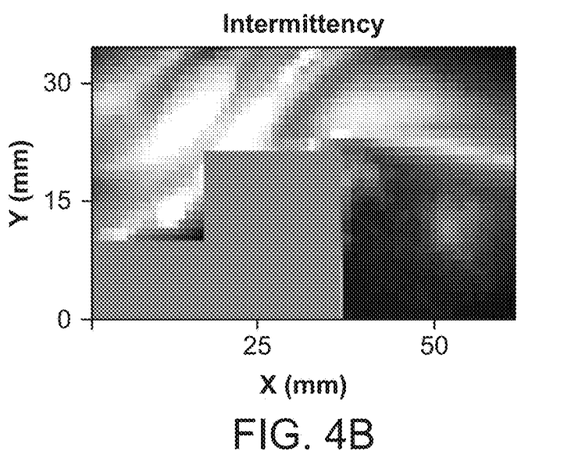
FIG. 4B illustrates the spatial distribution of local clustering coefficient during intermittency obtained by constructing a spatial network using Pearson correlation keeping the threshold correlation coefficient at 0.25.
Figure 4C:
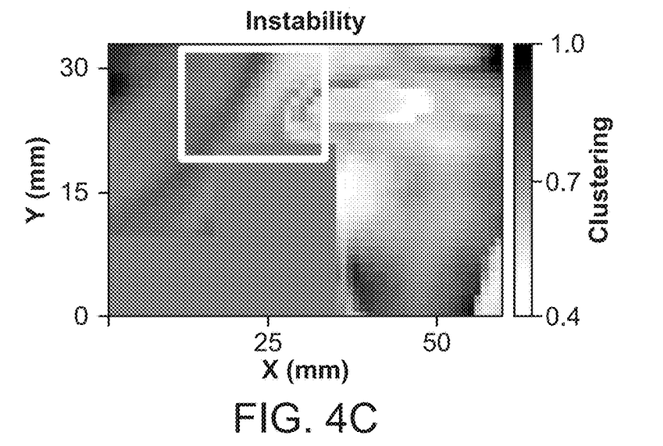
FIG. 4C illustrates the spatial distribution of local clustering coefficient during thermoacoustic instability obtained by constructing a spatial network using Pearson correlation keeping the threshold correlation coefficient at 0.25.
Figure 5A:
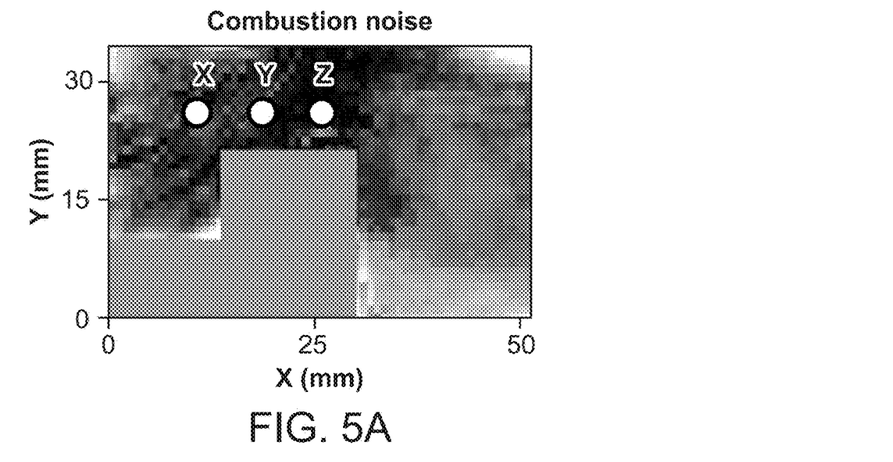
FIG. 5A illustrates the spatial distribution of betweenness during combustion noise obtained by constructing a spatial network using Pearson correlation keeping the threshold correlation coefficient at 0.25.
Figure 5B:
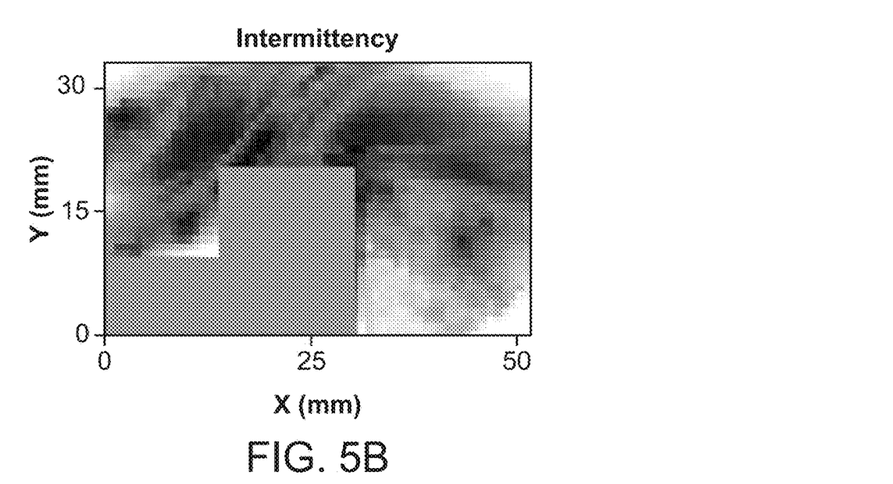
FIG. 5B illustrates the spatial distribution of betweenness during intermittency obtained by constructing a spatial network using Pearson correlation keeping the threshold correlation coefficient at 0.25.
Figure 5C:
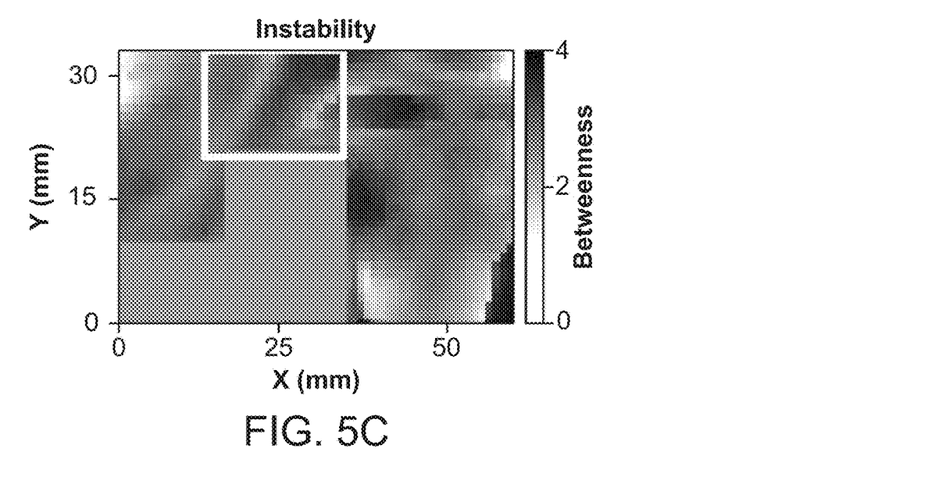
FIG. 5C illustrates the spatial distribution of betweenness during thermoacoustic instability obtained by constructing a spatial network using Pearson correlation keeping the threshold correlation coefficient at 0.25.
Figure 6A:
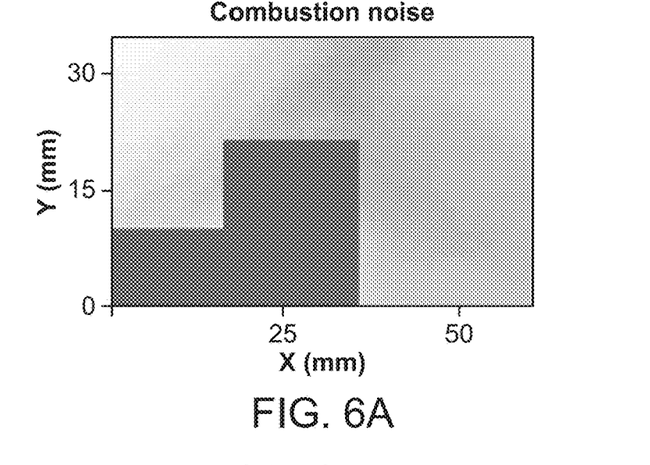
FIG. 6A illustrates the spatial distribution of closeness during combustion noise obtained by constructing a spatial network using Pearson correlation keeping the threshold correlation coefficient at 0.25.
Figure 6B:
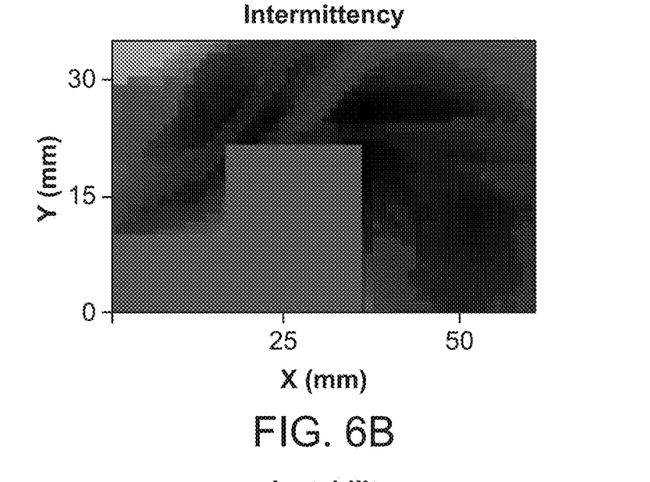
FIG. 6B illustrates the spatial distribution of closeness during intermittency obtained by constructing a spatial network using Pearson correlation keeping the threshold correlation coefficient at 0.25.
Figure 6C:
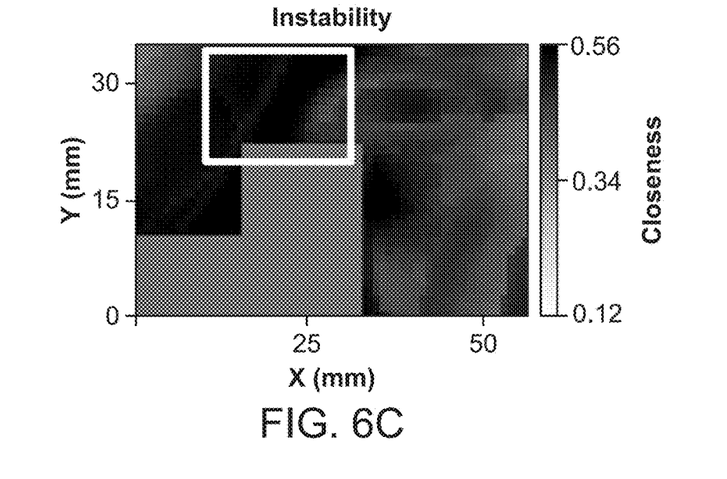
FIG. 6C illustrates the spatial distribution of closeness during thermoacoustic instability obtained by constructing a spatial network using Pearson correlation keeping the threshold correlation coefficient at 0.25.
Figure 7A:
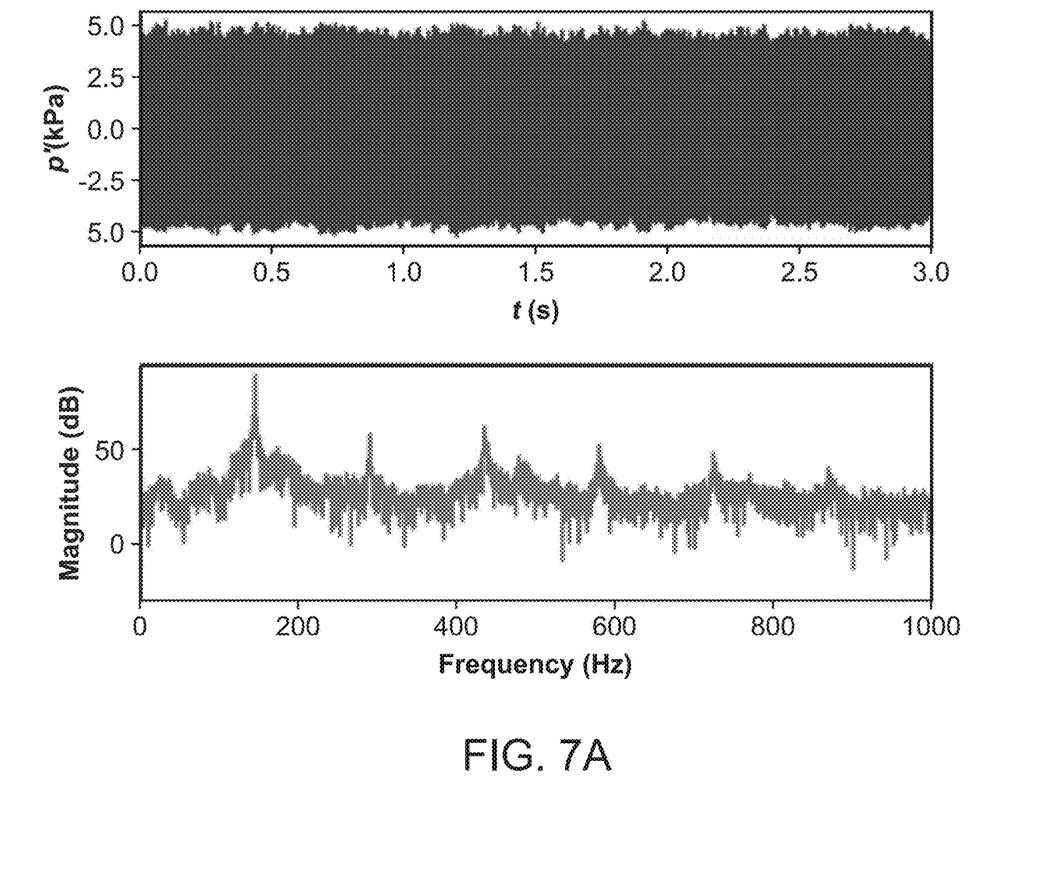
FIG. 7A illustrates pressure oscillations and corresponding power spectrum when no control was applied.
Figure 7B:
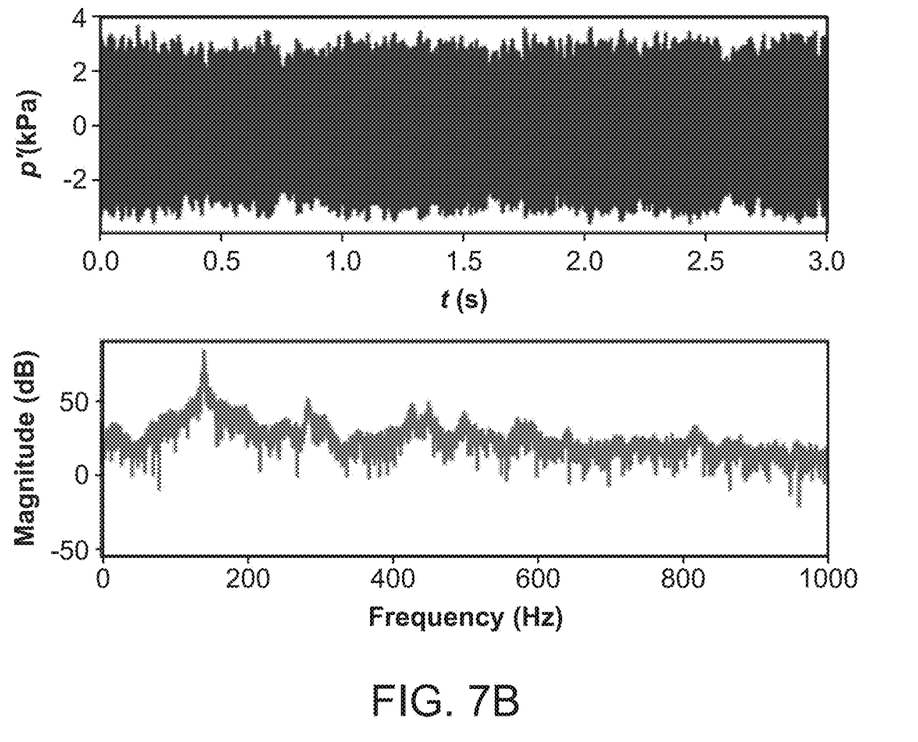
FIG. 7B shows the pressure oscillations and corresponding power spectrum when air jet of 25 SLPM was injected at point X.
Figure 7C:
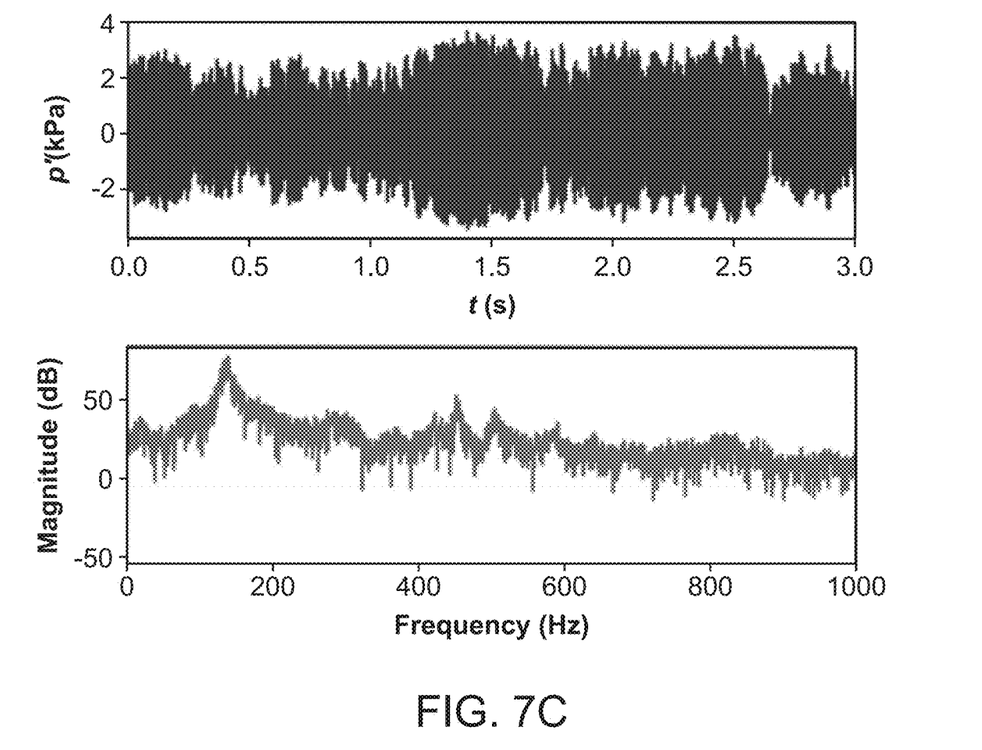
FIG. 7C illustrates the pressure oscillations and corresponding power spectrum when air jet of 25 SLPM was injected at point Y.
Figure 7D:
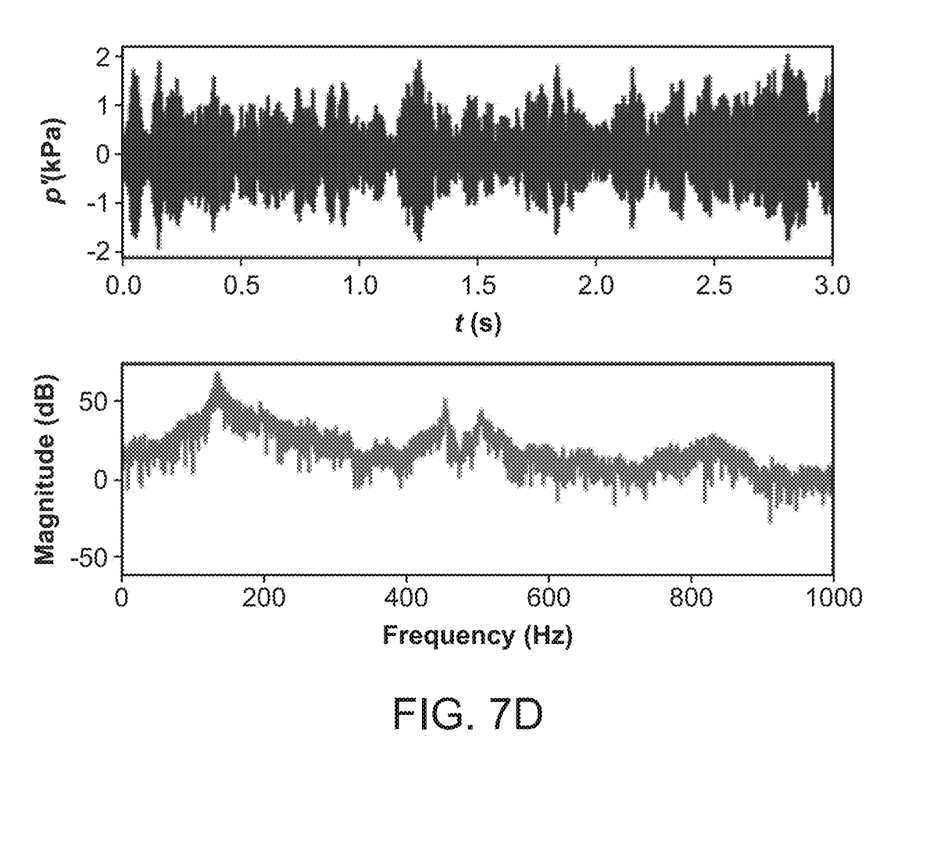
FIG. 7D shows the pressure oscillations and corresponding power spectrum when air jet of 25 SLPM was injected at point Z

The invention in various embodiments includes a computer implemented method that may effect a control strategy in a reactive flow field of a turbulent flow system. The method as shown in FIG. 2 includes receiving data from a sensing element 112 connected to the turbulent system 110 in step 201. In step 202, one or more flow field characteristics for the turbulent flow system are obtained. The flow field characteristics are selected from velocity, local reaction rate, temperature, mixture fraction and their like. A complex network is constructed corresponding to the flow field characteristics. In step 203, the obtained turbulent flow field is divided into regular or irregular grids. Each grid point is considered as a node, which results in the complex network having plurality of N nodes. In step 204, a correlation coefficient between at least a time series of flow field characteristics in a first node and a time series of the flow field characteristics in a second node is obtained and the two nodes are connected to form a link in step 205, if the correlation coefficient is above a threshold. Step 204 and step 205 are repeated for the N number of nodes in step 206 and a complex network is constructed in step 207. In step 208 an adjacency matrix of size N×N is obtained that describes the complex network completely. In step 209 network measures that characterize one or more topological features of the network is estimated. The network measures are selected from betweenness centrality (or betweenness), degree, closeness centrality (or closeness), transitivity and local clustering coefficient. Using the topological features of the constructed complex network, one or more critical regions of the reactive flow field are identified in step 210. In step 211, one or more modifications are applied to the control strategy based on the identified one or more critical regions.

In various embodiments to identify the one or more critical regions in the flow field that controls the oscillatory dynamics during thermoacoustic instability, relative strength of the network properties across the reaction field is determined.

In various embodiments the passive control strategy is selected from increasing the dissipation of acoustic energy, reducing the efficiency of acoustic driving, changing the axial location of the fuel injector, using a triangular cross section for the inlet, incorporating a multi-step dump having several backward facing steps, using miniature vortex generators in the inlet of the swirlers and at the exit of the burner circumference to interfere with the rollup of vortices by inducing stream wise vorticity, using perforated flame holders, placing perforated shrouds above the flame holders, stabilizing the vortex breakdown, placing a porous inert material at the dump plane, increasing the thickness of the perforated plate, using dynamic phase converters, using steady micro jet air injection near the flame anchoring zone, using flash atomization, and fuel staging.

In various embodiments the constructed complex network is a spatial network wherein the time information regarding the network is averaged out or a spatio-temporal network which captures both the spatial and temporal dynamics of the system. The network may be constructed based on Pearson's correlation. In another embodiment, the network may be constructed based on mutual information and/or conditioned measures and their like. Also, the analysis may be based on a network of networks or multiplex networks wherein one or more number of flow field variables are used for constructing the network of networks.

In some embodiments the control strategy may also include an active control strategy that may be applied at the one or more identified critical regions to control the oscillatory instabilities. In various embodiments the sensor data is obtained from particle image velocimetry (NV), laser Doppler velocimetry (LDV), Doppler global velocimetry (DGV), planar laser induced fluorescence (PLIF), high-speed chemiluminescence, pressure measurement, or numerical simulations such as large eddy simulations (LES) or direct numerical simulations (DNS).

In various embodiments the turbulent flow system is a combustor and the oscillatory instabilities comprise thermoacoustic instability. The system is most useful at the design stage of a combustor. Nevertheless, the system can also be used without loss of generality for altering the control strategy applied to an existing combustor, if alterations are allowable to the design of the combustor.

In various embodiments the method further includes an iterative optimization. The flow field incorporating the modified control strategy is analyzed to ensure that the criticality of the previously identified critical regions of the flow responsible for the onset of thermoacoustic instability is abated. This iteration can be continued until the optimization is achieved to the required level. The requirements herein can be an allowable amplitude level of thermoacoustic instability, allowable spatial variance or the value of network centrality measures obtained from the analysis performed by Part B.

While the above is a complete description of the embodiments of the invention, various alternatives, modifications, and equivalents may be used. It will be understood by those skilled in the art that various changes may be made and equivalents may be substituted without departing from the scope of the invention as described above. In addition, many modifications may be made to adapt to a particular situation or material the teachings of the invention without departing from its scope. Therefore, the above description and the examples to follow should not be taken as limiting the scope of the invention which is defined by the appended claims.

EXAMPLES

Example 1—Construction of a Spatial Network

For the purpose of elucidating the methodology of network construction, we used the velocity field corresponding to a turbulent combustor. However, similar analysis may be performed for other field quantities such as but not limited to local reaction rate, temperature, mixture fraction, vorticity etc. obtained either from experiments or numerical simulations. The velocity field used in this case is obtained through particle image velocimetry (PIV). This analysis can also be implemented to study oscillatory instabilities in other systems involving turbulent flow. First, the obtained turbulent reactive flow field was divided into a regular grid. In another scenario, irregular grids also may be used for network construction. Each grid point was considered as a node. Two nodes were connected based on the correlation between pairs of time series of velocity corresponding to each node. However, alternate criteria may also be used for network construction such as but not limited to, event synchronization, visibility, recurrence etc.

In this particular example, the network was constructed based on Pearson's correlation. Pearson's correlation coefficient is defined as follows:

$$R_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

where $x_i$ is the element of one velocity time series at a grid point, $y_i$ is the corresponding element of another velocity time series at a different grid point, i is the time index and n is the length of the observation (length of time series). The arithmetic means of both the time series are represented by $\bar{x}$ and $\bar{y}$ respectively. Two nodes of the network are connected if the Pearson's correlation coefficient between two time series of velocity at the corresponding nodes is above a threshold ($R_t$). We chose $R_t$ by analysing the link density of the network for different values of $R_t$. The link density ($\rho$) of a network refers to the ratio of actual number of links to the maximum possible number of links. If N is the number of nodes of a network and E is the actual number of links in the network, the link density is given by, $$\rho = \frac{2E}{N(N-1)} \quad (2)$$

where $N(N-1)/2$ is the maximum number of possible links of the given network. In the calculations presented in this disclosure, the threshold correlation coefficient is chosen as 0.25 since at this value, the variation in link density is a maximum amongst combustion noise, intermittency and thermoacoustic instability. Maximum variation in link density ensures maximum variability in network topology as the turbulent combustor transitions from combustion noise to thermoacoustic instability via intermittency which in turn will be reflected in the spatial distribution of network properties. In another scenario, threshold may be selected in an alternate manner in accordance to the requirements of the control strategy.

Example 2: Topological Measures Characterizing the Network

An adjacency matrix, a N×N square matrix, describes a network completely. The elements of the matrix, $A_{ij}$ (i, j=1, 2, . . . , N) is equal to one when a link $l_{ij}$ exists between the $i^{th}$ and $j^{th}$ node and zero otherwise. In the present study, the elements of the adjacency matrix, $A_{ij}$ is equal to one if $R_{ij} > R_t$ where $R_{ij}$ is the correlation coefficient between the velocity time series at grid points i and j respectively and $R_t$ is the threshold correlation coefficient. The adjacency matrix thus obtained is a symmetric matrix since the correlation network is undirected (i.e. i connected to j implies j connected to i).

In order to compare the topology of different networks we use some basic measures to characterize the spatial network obtained during combustion noise, intermittency and thermoacoustic instability. The degree ($k_i$) of a node (grid point) i gives the number of grid points linked to a particular grid point. It is given by $$k_i = \sum_{j=1}^{N} A_{ij} \quad (3)$$

where N is the total number of grid points in the flow field. A grid point having higher degree than others is expected to have stronger influence on the functioning of the network. The interconnectivity of neighbours of a grid point i is given by the local clustering coefficient ($C_i$). It is given by $$C_i = \frac{2E_i}{k_i(k_i - 1)} \quad (4)$$

where $E_1$ is the number of links between the neighbours of the grid point i and $k_i(k_i-1)/2$ is the maximum number of links possible among the neighbours. It gives an estimate of spatial continuity of the correlations in the velocity field.

Like degree, another measure that highlights the importance of a grid point is betweenness centrality ($b_i$), or simply referred to as betweenness. It is the sum of the ratio of the number of shortest paths between two grid points passing through a particular grid point to the total number of shortest paths between those two grid points. Mathematically, it is expressed as $$b_i = \sum_{j,k \in N, j \neq k} \frac{n_{jk}(i)}{n_{jk}} \quad (5)$$

where $n_{jk}(i)$ is the number of shortest paths between j and k passing through the grid point i. Physically, betweenness centrality of a node indicates the extent of information passed through that node, if we assume that the information travels through the shortest paths in the network. An additional node centrality measure is closeness centrality ($c_i$) which measures the inverse of the mean shortest path length from a node to all other nodes. If the shortest path between a grid point i to all other grid points j connected to it is d(i,j), then closeness centrality, or simply referred to as closeness, is given by $$c_i = \sum_{j \in N, j \neq i} 2^{-d(i,j)} \quad (6)$$

Physically, closeness centrality gives the measure of speed of information propagation in the network. For example, if any disturbance is given to a grid point with the highest closeness, it will reach other grid points in the flow field the fastest. The aforementioned network measures are only a few representative measures and various other measures such as but not limited to transitivity, weighted clustering etc. may also be used to characterize the topology of the constructed network or network of networks.

Example 3: Identifying Optimal Locations in the Flow Field to Apply the Control Strategy Once, network properties were evaluated, relative strength of these properties across the reaction field were investigated to identify the critical locations in the flow field that controls the oscillatory dynamics during thermoacoustic instability. Different network measures accentuate different aspects of the flow dynamics. The degree of a node gives the number of neighbors of that particular node in the spatial network. In the case of the spatial network constructed using Pearson correlation, very high degree implies that the correlation between the velocity fluctuations at the given grid point (here, a grid point in the flow field is the node) and that of large number of other grid points is above the threshold correlation ($R_t$).

Closeness centrality of a grid point measures the closeness of that particular grid point to all other grid points in the flow field. It is proportional to the reciprocal of the sum of shortest path lengths between a grid point and all other grid points in the flow field. Any perturbation given to a grid point with the highest value of closeness centrality travels in minimum time to all other grid points of the flow field.

The local clustering coefficient of a grid point gives the idea of connectivity among the neighbors of that grid point. High values of clustering coefficient for a grid point imply that the neighbors of the grid point are highly interconnected. From a flow perspective, this implies that the correlation between the velocity fluctuations of the neighbors of a given grid point is above a threshold. If a region is having high degree and high clustering coefficient, then, we can say that the given region is spatially coherent in terms of velocity fluctuations.

Betweenness centrality of a grid point gives the fraction of all the shortest paths for every pair of grid points in the flow field passing through the given grid point. High values of betweenness centrality for a grid point suggests that the grid point lies in between two regions of a network and a large number of shortest paths passes through that particular grid point. High values of betweenness centrality highlight the main pathways of information travel in a network if it is assumed that information propagates through shortest paths in a network. In the present analysis, the regions of high betweenness centrality indicate those locations that connect different parts of the flow that are otherwise uncorrelated to each other. Considering this, regions of high betweenness centrality are responsible for the increased correlation in the reactive flow field during an ordered behavior like thermoacoustic instability.

FIG. 3A, FIG. 4A, FIG. 5A and FIG. 6A show the spatial distribution of degree, local clustering coefficient, betweenness and closeness during combustion noise obtained by constructing a spatial network using Pearson correlation keeping the threshold correlation coefficient at 0.25 FIG. 3B, FIG. 4B, FIG. 5B and FIG. 6B shows the spatial distribution of degree, local clustering coefficient, betweenness and closeness during intermittency obtained by constructing a spatial network using Pearson correlation keeping the threshold correlation coefficient at 0.25 and FIG. 3C, FIG. 4C, FIG. 5C and FIG. 6C shows the spatial distribution of degree, local clustering, betweenness and closeness during thermoacoustic instability obtained by constructing a spatial network using Pearson correlation keeping the threshold correlation coefficient at 0.25 In, FIG. 3C, FIG. 4C, FIG. 5C and FIG. 6C it was seen that the part of the reactive flow marked by the black square has relatively high values of betweenness centrality, closeness and degree while having a low clustering coefficient. This indicates that this part of the reactive flow is key to ensuring the increased spatial correlation during thermoacoustic instability. This region was the most effective region for passive control to be applied on. From experiments, it was seen in FIG. 7A-FIG. 7D that when control in terms of micro jets was applied in the aforementioned critical region of the reaction field, thermoacoustic instability was suppressed. This control methodology is only an example of the control strategy. Any other control methodology that sufficiently alters the flow dynamics at the critical location may also be used for the control in an alternate scenario. Further, for another control methodology, a different network measure may be used to optimize the control strategy.

What is claimed is:

1. A computer implemented method for effecting a control strategy in a reactive flow field of a turbulent flow system, comprising the steps of:
   a) receiving data from a sensing element connected to the turbulent flow system incorporating a control strategy comprising at least a passive control strategy in the reactive flow field;
   b) obtaining one or more flow field characteristics for the turbulent flow system selected from one or more of velocity, local reaction rate, temperature or mixture fraction;
   c) constructing a complex network from a plurality of nodes (N) and a plurality of links based on the one or more flow field characteristics, wherein constructing the complex network comprises:
      i. dividing the obtained one or more flow field characteristics into one or more grids comprising the plurality of nodes (N);
      ii. obtaining a correlation coefficient between at least a first time series of the one or more flow field characteristics in a first node and a second time series of the one or more flow field characteristics in a second node;
      iii. connecting the first node and the second node to form a link if the correlation coefficient is above a threshold; and
      iv. performing steps (ii) and (iii) for the plurality of nodes (N) to obtain the plurality of links;
   d) obtaining an adjacency matrix of size N×N describing the complex network;
   e) finding measures to characterize one or more topological features of the complex network selected from one or more of betweenness centrality, degree, closeness centrality, transitivity and local clustering coefficient;
   f) identifying one or more critical regions of the reactive flow field using the one or more topological features of the complex network, wherein the identifying comprises: determining a relative strength of the one or more topological features across reaction fields during oscillatory instabilities; and
   g) applying one or more modifications to the control strategy based on the identified one or more critical regions.

2. The method of claim 1, wherein the complex network is a spatial network or a spatio-temporal network.

3. The method of claim 1, wherein the control strategy further comprises: an active control strategy to be applied at the identified one or more critical regions to control the oscillatory instabilities.

4. The method of claim 1, wherein the data is obtained from particle image velocimetry (NV), laser Doppler velocimetry (LDV), Doppler global velocimetry (DGV) planar laser induced fluorescence (PLIF), high-speed chemiluminescence, pressure measurement or numerical simulation.

5. The method of claim 1, wherein the turbulent flow system is a combustor and the oscillatory instabilities comprise thermoacoustic instability.

6. The method of claim 1, further comprising: determining that the oscillatory instabilities are lower than or equal to a predetermined level on applying the one or more modifications to the passive control strategy.

7. A system for effecting a control strategy in a reactive flow field of a turbulent flow system comprising:
   a processor; and
   a non-transitory computer readable storage medium having instructions encoded thereon that, when executed by the processor, cause the processor to:
      a. receive data from a sensing element connected to the turbulent flow system incorporating at least a passive control strategy in the reactive flow field;
      b. obtain one or more flow field characteristics for the turbulent flow system selected from one or more of velocity, local reaction rate, temperature, or mixture fraction;
      c. construct a complex network from the plurality of nodes (N) and links based on the one or more flow field characteristics, wherein constructing the complex network based on the one or more flow field characteristics comprises:
         i. dividing the obtained one or more flow field characteristics into one or more grids comprising the plurality of nodes (N);
         ii. obtaining a correlation coefficient between at least a first time series of the one or more flow field characteristics in a first node and a second time series of the one or more flow field characteristics in a second node;
         iii. connecting the first node and the second node to form a link if the correlation coefficient is above a threshold; and iv. performing steps (ii) and (iii) for the plurality of nodes (N) to obtain the plurality of links;
d. obtain an adjacency matrix of size N×N describing the complex network;
e. find network measures to characterize one or more topological features of the complex network selected from one or more of betweenness centrality, degree, closeness centrality, transitivity and local clustering coefficient;
f. identify one or more critical regions of a reactive flow field using the one or more topological features of the complex network, wherein the identifying comprises: determining a relative strength of the one or more topological features across reaction fields during oscillatory instabilities; and
g. apply one or more modifications to the passive control strategy based on the identified the one or more critical regions.

8. The system of claim 7, wherein the control strategy further comprises: an active control strategy to be applied at the identified one or more critical regions to control the oscillatory instabilities.

9. The system of claim 7, wherein the instructions further cause the processor to: determine that the oscillatory instabilities are lower than or equal to a predetermined level on applying the one or more modifications to the passive control strategy.

10. A non-transitory machine-readable storage medium storing instructions which, when executed by one or more processors, cause the one or more processors to perform operations comprising:
a) receiving data from a sensing element connected to the turbulent flow system incorporating a control strategy comprising at least a passive control strategy in the reactive flow field;
b) obtaining one or more flow field characteristics for the turbulent flow system selected from one or more of velocity, local reaction rate, temperature, or mixture fraction;
c) constructing a complex network from a plurality of nodes (N) and a plurality of links based on the one or more flow field characteristics wherein constructing the complex network based on the flow field characteristics comprises:
   i. dividing the obtained one or more flow field characteristics into one or more grids comprising the plurality of nodes (N);
   ii. obtaining a correlation coefficient between at least a first time series of the one or more flow field characteristics in a first node and a second time series of the one or more flow field characteristics in a second node;
   iii. connecting the first node and the second node to form a link if the correlation coefficient is above a threshold; and
   iv. performing steps (ii) and (iii) for the plurality of nodes (N) to obtain the plurality of links;
d) obtaining an adjacency matrix of size N×N describing the complex network;
e) finding network measures to characterize one or more topological features of the complex network selected from one or more of betweenness centrality, degree, closeness centrality, transitivity and local clustering coefficient;
f) identifying one or more critical regions of the reactive flow field using the one or more topological features of the complex network, wherein the identifying comprises: determining a relative strength of the one or more topological features across reaction fields during oscillatory instabilities; and
g) applying one or more modifications to the control strategy based on the identified one or more critical regions.

* * * * *